UNITED STATES PATENT OFFICE.

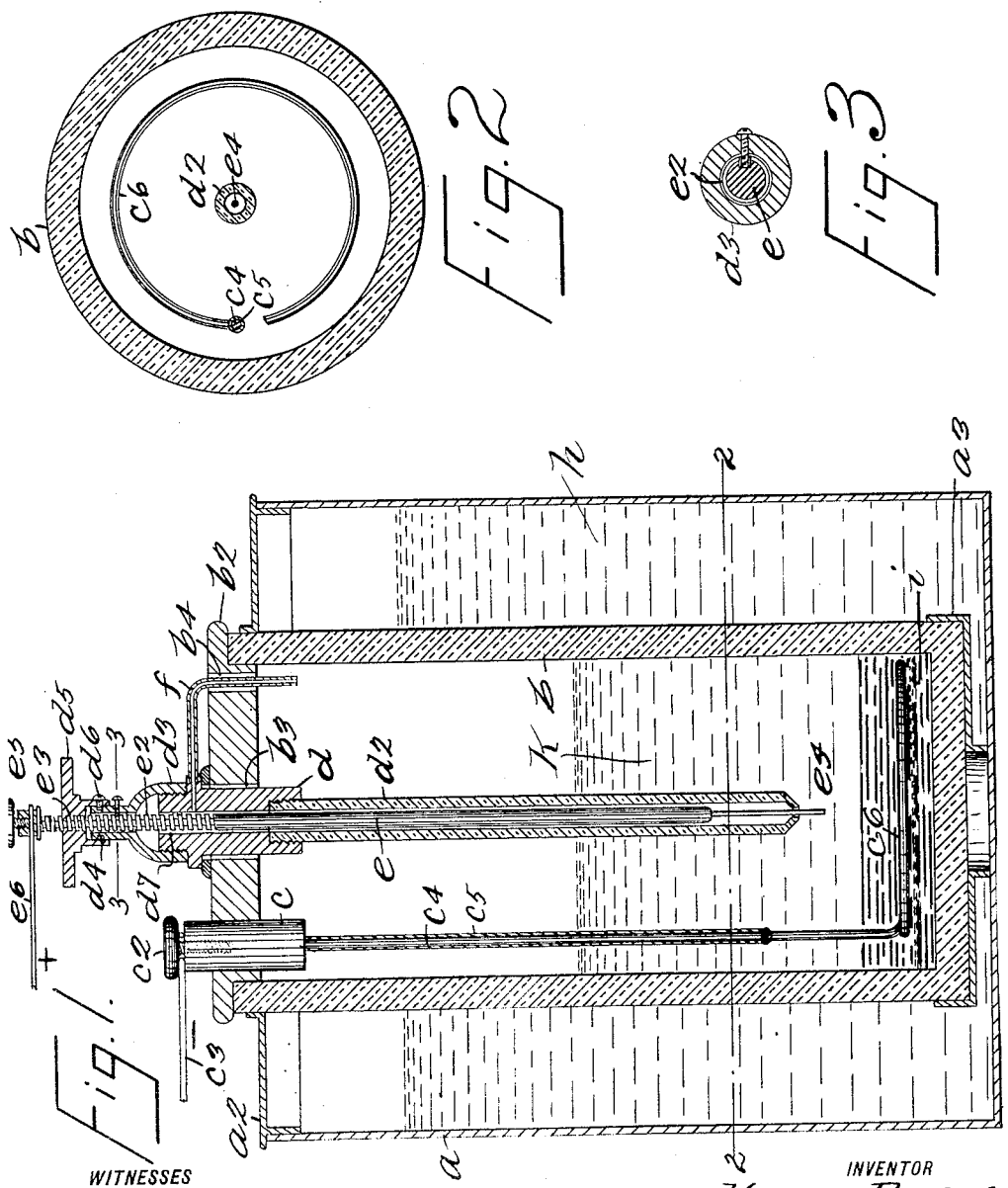

HERMAN BESSER, OF NEW YORK, N. Y., ASSIGNOR OF ONE-HALF TO ISRAEL COBE, OF NEW YORK, N. Y.

INTERRUPTER FOR ELECTRICAL CIRCUITS.

No. 827,781.     Specification of Letters Patent.     Patented Aug. 7, 1906.

Application filed September 25, 1905. Serial No. 279,920.

*To all whom it may concern:*

Be it known that I, HERMAN BESSER, a citizen of the United States, residing at New York, in the county of New York and State of New York, have invented certain new and useful Improvements in Interrupters for Electrical Circuits, of which the following is a specification, such as will enable those skilled in the art to which it appertains to make and use the same.

This invention relates to electrolytic interrupters for electrical currents and the method of operating same; and this invention comprises an improved interrupter for electrical circuits which include one or more induction-coils in said circuits for the purpose of inducing oscillating currents in secondary circuits and an improved method of operating such interrupter, whereby the potential and frequency of secondary currents are augmented and rendered constant for long periods of time, a further object being to provide an interrupter which will operate with a higher degree of efficiency and which is alike applicable for the use of constant and alternating currents; and with these and other objects in view this invention consists of an interrupter constructed and operated as hereinafter described and claimed.

The invention is fully disclosed in the following specification, of which the accompanying drawings form a part, in which the separate parts of my invention are designated by suitable reference characters in each of the views, and in which—

Figure 1 is a central vertical section taken through an interrupter constructed according to my invention; Fig. 2, a partial section on the line 2 2 of Fig. 1, and Fig. 3 a section on the line 3 3 of Fig. 1.

In the drawings forming part of this specification I have shown an outer casing $a$, provided with a detachable cover $a^2$, and in the bottom of this casing is placed a support $a^3$ for a jar $b$, placed centrally in the casing $a$, said jar $b$ being composed of porcelain, glass, or other suitable non-conducting material. The annular space $h$ between the outer casing $a$ and the inner jar $b$ is to be filled with water for the purpose of acting as a sound-muffler against the high-pitched tones which emanate from the jar $b$ when the interrupter is in operation. The jar $b$ extends upwardly and above the cover $a^2$ of the outer jar $a$ and is also provided with a detachable cover $b^2$, having a central opening $b^3$, which serves the purpose of admitting one of the electrodes. A supplemental opening adjacent to one edge of the cover $b^2$ is provided with a plug $c$, which serves as a binding-post for the terminal $c^3$ of the main circuit. Fastened to the bottom of the plug $c$ is an electrode $c^4$, which extends downwardly into the jar $b$, and said electrode is made from copper and has an outer tin or metal foil covering $c^5$. Secured to the lower end of said electrode $c^4$ and forming a part therewith is a metal coil or segment $c^6$, also composed of copper, and is arranged horizontally and closely adjacent to the bottom of the jar $b$, and said coil $c^6$ may contain one or more convolutions, the object being to bring as much metal surface of this electrode in contact with the electrolyte $k$, contained within the jar $b$, as possible.

Passing through the opening $b^3$ and extending into the jar $b$ is a metal plug $d$, to which is secured a porcelain tube $d^2$, which extends downwardly to a position adjacent to but above the coil $c^6$, and the plug $d$ is provided at the top thereof with a cap $d^3$, which in turn is provided with an outer annular groove $d^4$ at the top thereof, and rotatably mounted on the cap $d^3$ is a disk $d^5$, through which passes a screw $d^6$, which operates in the groove $d^4$, and by means of this construction it will be seen that the disk $d^5$ may be rotated upon the cap $d^3$ without changing the relative positions thereof.

The plug $d$ is provided with a central bore $d^7$, in which is mounted a vertically-movable rod $e$, preferably composed of lead, and the top of which is preferably composed of iron or steel and provided with a screw-thread, as shown at $e^2$, and the screw-thread $e^2$ engages a similar screw-thread $e^3$ in the rotatable disk $d^5$, and secured to the bottom of the rod $e$ is a platinum tip $e^4$, which normally projects a predetermined distance below the porcelain tube $d^2$, and this distance is capable of being varied by the rotation of the disk $d^5$, as will be readily seen. Mounted on the top of the rod $e$ is a binding-post $e^5$ for the terminal $e^6$ of the main circuit.

Secured to the plug $d$ above the cover $b^2$ is a metal tube $f$, which is bent downwardly and passes through the supplemental opening $b^4$ in the cover $b^2$, the object of the bent tube $f$ being to provide a by-pass for such portion of the electrolyte as has a tendency to creep upwardly within the porcelain tube $d^2$ whenever the electrolyte becomes strongly agitated in the action of the interrupter, and said tube also prevents the turning of the plug $d$.

The electrolyte $k$ in the jar $b$ is composed of an approximately one to eight proportioned solution of sulfuric acid and water, and placed in the bottom of the jar $b$ and covering entirely the horizontal segmental part $c^6$ of the copper electrode $c^4$ is a quantity of metallic mercury $i$. It will be understood also that the conductors $c^3$ and $e^6$ form part of a circuit in which is included any source of electrical supply, rheostats, switches, and induction-coils in the usual manner, said features not being shown in the drawings, as they form no part of my invention.

In the operation of my apparatus the platinum electrode serves as the anode and the copper electrode as the cathode. As soon as a current is sent through the interrupter both electrodes become amalgamated with mercury as far as they extend into the electrolyte, which amalgamation serves two purposes—that of protecting the exposed portions of the electrodes against disintegration and that of a means by which rapid interruption take place through the reduction of the metallic mercury. The internal resistance of the interrupter being very large and a current which passes from the anode to the cathode in overcoming such resistance develops an extreme high degree of heat, which latter, acting upon the metallic mercury, together with the chemical action of the sulfuric acid of the electrolyte, tends to produce the above-referred reduction of the mercury. During the stage of such reduction particles of mercury float in the electrolyte, and such particles as find themselves in the path of the current from the anode to the cathode act as a metallic conductor of the current, become fused, and arethen chemically acted upon by the sulfuric acid in the electrolyte. At the moment of disintegration of the metallic conducting-chain of particles of mercury between the anode and cathode the current is temporarily broken or interrupted, whereupon a new chain of particles of floating mercury reëstablishes itself in the path of the current, the passage of the current from anode to cathode takes place again, and a successive and extremely rapid break and make of the current thereby takes place in the interrpter. In addition to this method of interrupting the current in my apparatus another effect is produced within the current actuated upon by my interrupter—namely, a counterelectro reaction force within the primary and secondary winding of the induction-coil, which forms part of this circuit. It is believed that at the moment of such interruptions, the flow of the current being checked in the primary winding of the induction-coil, such coil will momentarily act as a choke-coil—that is to say, the induced current in the secondary winding, considered as stored energy, will react upon the primary winding, and thereby momentarily emphasize the intensity of the oscillations obtained, and by the resumption of the current flowing through the interrupter this chain of action is repeated, thereby establishing within the secondary winding a current of extremely high frequency. In this manner all the mercury is gradually reduced to a subsulfate of mercury, and in order to maintain the efficiency of my interrupter the metallic mercury and the electrolyte must be replenished from time to time. In case an alternating current is used in the main circuit exactly the same effect is produced throughout the operation of my apparatus.

By means of my invention it will be seen that a continuous and rapid interruption of an electrical current is obtained; that also by means of such interruption a constant current of low pressure is changed into an oscillating current of high tension and an alternating current into an oscillating direct current without the use of any additional converter; that said interruptions being continuous at any temperature of the electrolyte, and that said interruptions continue as long as mercury remains within the jar in its metallic state or upon the electrodes; that the efficiency obtained by my apparatus is greatly in advance of that of other apparatus for like purposes; that the high frequency and high tension obtained are under absolute control of the operator by adjusting the current strength in the main circuit by means of a rheostat or any other resistance, and that the pitch of the tones incidental to the interruption can easily be regulated to suit any purpose by vertical adjustment of the anode.

It is obvious that other metals or compositions may be substituted for the electrodes and other changes and modifications of the construction herein shown and described may be made without departing from the spirit of my invention or sacrificing its advantages.

My interrupter can be applied for various other uses for which such an apparatus is usually designed, such as for the production of the Finsen light, Roentzen rays, for the manufacture of ozone by means of the silent brush discharge, for the application of its use to X-ray machines, for welding and fusing purposes, for the production of the Hertzian waves, for wireless telegraphy, and various other purposes not specifically mentioned here.

Having fully described my invention, what I claim as new, and desire to secure by Letters Patent, is—

1. The method of interrupting electrolytically an electric current by subjecting metallic mercury within a cell to the electrochemical action of the electric current during its passage from one of the electrodes to the other electrode, substantially as shown and described.

2. In an electrolytic interrupter, a cell containing metallic mercury and an electrolyte, and positive and negative electrodes, one of which is in contact with the metallic mercury, substantially as shown and described.

3. In an electrolytic interrupter, a cell containing an electrolyte and metallic mercury, a negative permanently-fixed electrode which makes constant and physical contact with the mercury, and a positive electrode mechanically adjustable for the purpose of increasing and decreasing the internal resistance of said cell, substantially as shown and described.

4. In an electrolytic interrupter, a cell, a sulfuric-acid-solution electrolyte, a positive electrode, a negative electrode and metallic mercury within said cell, such metallic mercury being in contact with the negative electrode and subjected to the electrochemical action of a current sent through the cell, substantially as shown and described.

5. In an electrolytic interrupter, a cell, a sulfuric-acid-solution electrolyte, a positive platinum electrode, a negative copper electrode and metallic mercury within said cell, such metallic mercury being in contact with the negative electrode and subjected to the electrochemical action of a current sent through the cell, substantially as shown and described.

6. In an electrolytic interrupter, a cell containing an electrolyte and metallic mercury, and positive and negative electrodes, one of which makes contact with the electrolyte and the other with the mercury, one of said electrodes being also adjustable, substantially as shown and described.

In testimony that I claim the foregoing as my invention I have signed my name, in presence of the subscribing witnesses, this 23d day of September, 1905.

HERMAN BESSER.

Witnesses:
F. A. STEWART,
O. J. KLEIN.